(12) United States Patent
Strijker

(10) Patent No.: US 9,252,673 B2
(45) Date of Patent: Feb. 2, 2016

(54) CONTROLLER

(71) Applicant: NXP B.V., Eindhoven (NL)

(72) Inventor: Joan Wichard Strijker, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/693,718

(22) Filed: Apr. 22, 2015

(65) Prior Publication Data

US 2015/0333639 A1 Nov. 19, 2015

(30) Foreign Application Priority Data

May 13, 2014 (EP) .................................... 14168190

(51) Int. Cl.
*H02M 3/335* (2006.01)
*G05B 15/02* (2006.01)
*H05B 33/08* (2006.01)

(52) U.S. Cl.
CPC ........... *H02M 3/33515* (2013.01); *G05B 15/02* (2013.01); *H05B 33/0815* (2013.01); *H05B 33/0842* (2013.01)

(58) Field of Classification Search
USPC ............. 315/209 R, 274–280, 247, 224, 225, 315/185 S, 291, 307–326
See application file for complete search history.

(56) References Cited

U.S. PATENT DOCUMENTS 9,018,851 B1 * 4/2015 Melanson .......... H05B 33/0815
315/185 S

FOREIGN PATENT DOCUMENTS

WO  WO 2013/067550 A2  5/2013

OTHER PUBLICATIONS

NXP B.V., TEA1750, GreenChip III SMPS control IC, Product Data Sheet, Rev. 2, 29 pgs. (Dec. 15, 2008).
Extended European Search Report for Patent Appln. No. 14176580.0 (Nov. 3, 2015).

* cited by examiner

*Primary Examiner* — Tuyet Vo

(57) ABSTRACT

A controller (606) for a switched mode power supply (100), comprising: a first terminal (620) for receiving a controller input voltage (Vcc); a second terminal for coupling to ground (654); a selectably engagable load (656); a load selector (658) configured to: engage the selectably engagable load between the first and second terminals in order to draw a selectably engagable load current ($I_{extra}$), and disengage the selectably engagable load from the first and second terminals in accordance with a comparison between a disengagement threshold and the controller input voltage or an input current at the first terminal.

15 Claims, 6 Drawing Sheets

CONTROLLER

CROSS-REFERENCE TO RELATED APPLICATIONS

This application claims the priority under 35 U.S.C. §119 of European patent application No. 14168190.8, filed on May 13, 2014, the contents of which are incorporated by reference herein.

The disclosure relates to a controller for a switched mode power supply such as a buck or flyback converter.

Switched mode power supplies (SMPS) are commonly used in power supply units to convert a source, such as a mains input voltage into a desired output voltage. A SMPS comprises a switch arranged between an input and an output of the switched mode power supply. The switch is typically provided by a field effect transistor and is operable between an open state and a closed state. The SMPS also comprises a switch toggling unit configured to toggle the switch between the open state and the closed state in order to transfer energy from the input to the output of the power supply. This toggling is conducted periodically and typically at a frequency of tens or hundreds of kilo Hertz.

According to a first aspect of the invention there is provided a controller for a switched mode power supply (SMPS) comprising:
  a first terminal for receiving a controller input voltage;
  a second terminal for coupling to ground;
  a selectably engagable load;
  a load selector configured to:
    engage the selectably engagable load between the first and second terminals in order to draw a selectably engagable load current, and
    disengage the selectably engagable load from the first and second terminals in accordance with a comparison between a disengagement threshold and (i) the controller input voltage or (ii) a controller input current at the first terminal.

The controller can engage the selectably engagable load in order to present an increased current demand during start-up and disengage it in order to reduce the current demand during operation. This can prevent unwanted on-off behaviour. Use of hysteresis for the start (engage) and stop (disengage) conditions can enable the SMPS to continuously operate once started with a supply current that is known to be adequate for steady state operation.

The first terminal may be a Vcc terminal. The second terminal may be a ground terminal. A switch toggling unit of the switched mode power supply may only be enabled once the controller input voltage or input current at the first terminal has met a start threshold (which may be a current or voltage). On or during start-up of the switched mode power supply the controller can, by engaging the selectably engagable load, increase the current demand at the first terminal and so may reduce the voltage at, or current available from, the first terminal. The engagement of the selectably engagable load can therefore prevent the enabling of the switch toggling unit at suboptimal supply currents or voltages that may cause oscillation of the output of the power supply if the switch toggling unit were enabled. While the selectably engagable load is engaged, and once the controller input voltage or input current at the first terminal has increased to the disengagement threshold, then it may be that the controller input voltage or input current at the first terminal is sufficient to operate the controller without causing oscillation at the output. The selectably engagable load may then be disengaged at the disengagement threshold. The additional current drain on first terminal may be disengaged when the voltage at, or available current from, the first terminal meets the start threshold which enables the switch toggling unit of the power supply. That is, the start threshold may be the same as the disengagement threshold. The operation of the switch mode power supply (or the switch toggling unit) after the switch toggling unit is enabled may be similar to that of power supplies known in the art.

A comparison between a threshold and the voltage or current may be a comparison between: a voltage threshold and a voltage of the switched mode power supply; or a current threshold and a current of the switched mode power supply. The load selector may be configured to engage the selectably engagable load in accordance with a comparison between the controller input voltage or input current at the first terminal and an engagement threshold. The load selector may be configured to engage the selectably engagable load on activation of the controller.

The switched mode power supply may comprise a switch arranged between an input and an output of the switched mode power supply, SMPS. The input of the SMPS may comprise a mains input terminal. The switch may be operable between an open state and a closed state. The switched mode power supply or the controller may comprise a switch toggling unit. The switch toggling unit may be configured, the switch toggling unit is enabled by the controller input voltage or input current at the first terminal meeting a start threshold, to toggle the switch between the open state and the closed state in order to transfer energy from the input to the output of the SMPS.

The switched mode power supply may draw a parasitic operating current from the input of the SMPS when the switch toggling unit is enabled. The switched mode power supply may be configured to draw a start-up current from the input of the SMPS when the switch toggling unit is disabled. An amount of current drawn by the selectably engagable load may be set in accordance with a difference between the start-up current and the operating current.

The disengagement threshold may be set in accordance with the operating current. The start threshold may be equal to, or different from, for example higher than, the disengagement threshold.

The controller may comprise the switch toggling unit. The controller may be provided in a unitary housing such as an integrated circuit. The switch toggling unit may be configured, when enabled, to provide a control signal for setting the state of the switch. The controller may further comprise a switch control terminal for providing the control signal to the switch of the switched mode power supply. The controller may comprise a comparator unit configured to enable the switch toggling unit when the controller input voltage or input current at the first terminal meets the start threshold.

The switched mode power supply may comprise:
  a supply capacitor with a first plate and a second plate, the first plate connected to the first terminal of the controller and the second plate connected to the second terminal of the controller; and
  a current limiting resistor coupled between the first terminal of the controller and the input, or a rectified input, of the SMPS.

There may be provided a computer program, which when run on a computer, causes the computer to configure any apparatus, including a circuit, controller, switched mode power supply, or device disclosed herein or perform any method disclosed herein. The load selector may comprise a computer program. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

According to a second aspect of the invention there is provided a switched mode power supply comprising the controller described above. There may be provided a switched mode power supply comprising any controller disclosed herein. There may also be provided an LED lighting system comprising any controller or switched mode power supply disclosed herein.

One or more embodiments of the invention will now be described, by way of example only, and with reference to the accompanying figures in which.

Figure 1:
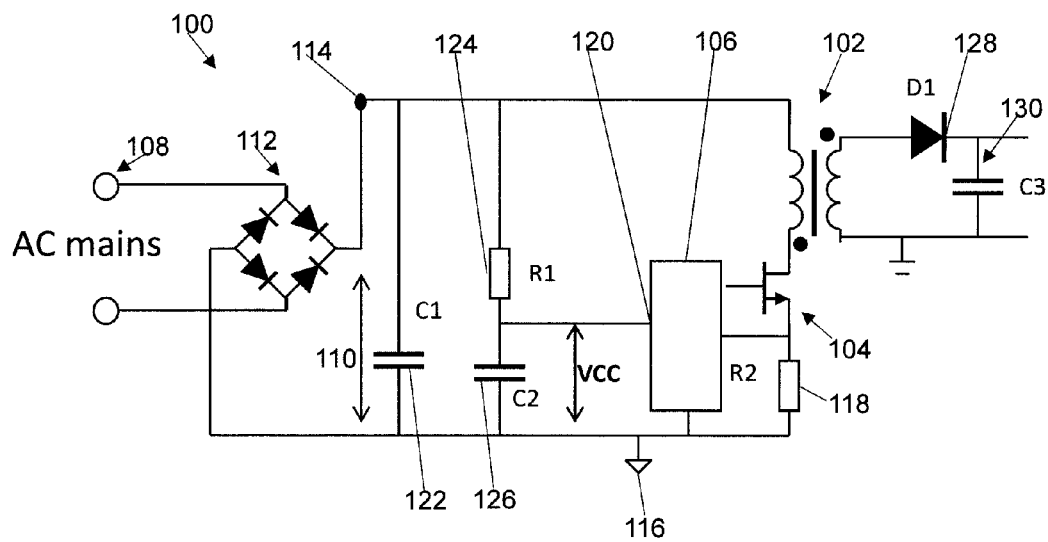
FIG. 1 shows a flyback converter.

FIG. 1 illustrates a flyback switched mode power supply (SMPS) 100. The SMPS 100 comprises a transformer 102, a power switch 104 and a controller 106. The SMPS 100 is configured to receive an AC mains voltage at mains input terminals 108 of the SMPS 100. The mains voltage is converted to a rectified mains voltage 110 of the SMPS 100 by a rectifier 112. The rectified mains voltage 110 is provided between a rectified mains terminal 114 and a ground terminal 116. A switchable conduction path is provided between the rectified mains terminal 114 and the ground terminal 116. The switchable conduction path comprises a primary winding of the transformer 102, a conduction channel of the power switch 104 and a switchable conduction path resistor 118 connected in series.

A smoothing capacitor 122 is provided across the output of the rectifier 112 between the rectified mains terminal 114 and the ground terminal 116. A current limiting resistor 124 and a supply capacitor 126 are provided in series between the rectified mains terminal 114 and the ground terminal 116. The supply capacitor 126 has a first plate and a second plate. The second plate is connected to the ground terminal 116. The current limiting resistor is connected between the rectified mains terminal 114 and the first plate of the supply capacitor 126.

The controller 106 has a ground connection coupled to the ground terminal 116, a voltage sensing connection connected to a junction between the power switch 104 and the switchable conduction path resistor 118, a switch control terminal connected to a gate of the power switch 104, and a Vcc terminal 120 for receiving the controller input voltage or input current from the rectified mains terminal 114. The Vcc terminal 120 may also be referred to as a first terminal of the controller 106. The ground terminal may also be referred to as a second terminal of the controller 106. The Vcc terminal 120 is connected to the first plate of the supply capacitor 126 such that a Vcc voltage across the supply capacitor 126 is provided as a controller input voltage to the controller 106.

The controller 106 comprises a switch toggling unit (not shown in FIG. 1). The switch toggling unit is configured, when enabled, to provide a control signal for setting the state of the power switch 104 via the switch control terminal of the controller 106. The switch toggling unit is enabled when the Vcc terminal 120 of the controller 106 reaches a start threshold $V_{start}$. Otherwise, the switch toggling unit is disabled, or idle. An under-voltage-lock-out voltage (stop threshold $V_{stop}$) can be implemented by the controller 106 to stop the operation of the switch toggling unit if, when the switch toggling unit is enabled, the supply voltage falls below the stop threshold $V_{stop}$.

On a secondary side of the transformer 102, a secondary side winding is provided in series with an output rectifier diode 128. The series arrangement of the secondary side winding of the transformer 102 and the output rectifier diode 128 is provided in parallel with an output smoothing capacitor 130. A first terminal of the output smoothing capacitor 130 is coupled to a cathode of the diode 128 in this example. A second plate of the output smoothing capacitor 130 is coupled to the secondary side winding of the transistor 102 and ground. An output voltage of the switched mode power supply 100 is provided across the output smoothing capacitor 130.

When the AC mains supply is connected to the mains input terminals 108 of the SMPS 100, the rectified mains voltage 110 between the rectified mains terminal 114 and the ground 116 will begin to rise. As soon as Vcc (the voltage across the supply capacitor 126) rises above a start-up voltage of the control unit 106, the controller 106 will initiate the switch toggling unit within the controller 106. The controller 106 consumes more supply current in a switching state (when the switch toggling unit is enabled) than in a non-switching, idle state (when the switch toggling unit is disabled). For example, an additional supply current may be needed to drive the power switch 104, which may be provided by a metal-oxide semiconductor field effect transistor (MOSFET).

If the current supplied to the Vcc terminal 120 of the controller 106 is insufficient for steady state operation, the SMPS may switch off during operation because of the higher current demand of the controller not being met when the switch toggling unit is enabled. That is, when the supply current is just sufficient to charge the supply capacitor 126 to the start-up voltage level ($V_{start}$), it may not be high enough to supply the SMPS during operation. The voltage at the Vcc terminal 120 of the controller 106 will drop when the controller 106 draws more current in order to start switching the power switch 104, as the supply capacitor 126 discharges into the controller 106. If the voltage at the Vcc terminal 120 drops below the stop threshold (a voltage level where the SMPS cannot work properly anymore), the switch toggling unit is disabled. As soon as the switch toggling unit is disabled, the current demand of the controller 106 is reduced and the supply capacitor 126 is able to recharge to the start-up voltage level, at which point the switch toggling unit is enabled again. This on-off behaviour leads to undesired oscillation of the output voltage across the output smoothing capacitor 130. Also, if the current through the current limiting resistor 124 drops during operation mode, as may be the case in a buck configuration, then this unwanted on-off behaviour can also occur.

Figure 2:
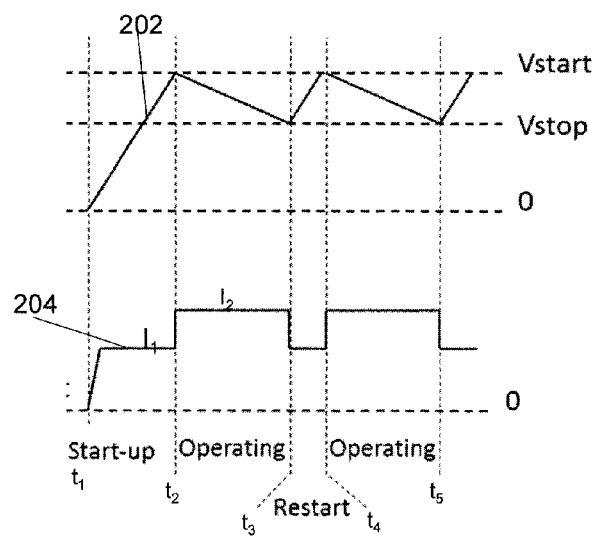
FIG. 2 shows signals within the flyback converter of FIG. 1 during start-up and operation.

FIG. 2 illustrates the behaviour of the switched mode power supply of FIG. 1 when inadequate current is available from the rectified mains supply upon enablement of the switch toggling unit. A first curve shows a voltage 202 at the Vcc terminal of the controller of FIG. 1 against time. A second curve in FIG. 2 shows, against time, the current 204 drawn by the controller at the Vcc terminal.

The switched mode power supply 100 is turned on at a first time instant $t_1$, and a start-up phase commences. At the beginning of the start-up phase the current 204 drawn by the controller rises rapidly when the controller is switched on until a first current level $l_1$ is reached. The current demand 204 then becomes constant at the first current level $l_1$. During this period the voltage 202 at the Vcc terminal of the controller increases linearly as the supply capacitor receives current from the power supply and builds up charge across its plates.

Once the voltage 202 at the Vcc terminal of the controller reaches a start threshold $V_{start}$, the switch toggling unit within the controller is enabled. The switch toggling unit is configured to provide a control signal for setting a state of the power switch of the switched mode power supply via the switch control terminal of the controller. The enabling of the switch toggling unit occurs at a second time instant $t_2$.

At $t_2$ the demand current 204 drawn by the controller increases to a second current level $l_2$ because the controller and other components of the switched mode power supply, such as the power switch, require more current during the operating phase. Therefore, during the operating phase the voltage across the supply capacitor decreases as current is drained from the supply capacitor in order to satisfy the current demand of the controller. In this example, the current available from the mains power supply and the charged supply capacitor is insufficient to operate the controller. When the Vcc voltage 202 across the supply capacitor falls to the stop threshold $V_{stop}$ (below which the switch toggling unit can no longer operate) the switch toggling unit is disabled. This disabling of the switch toggling unit occurs at a third time instant $t_3$ in FIG. 2. At the third time instant $t_3$ the current demand at the first terminal decreases from the second current level $l_2$ to the first current level $l_1$ because the switch toggling unit has been disabled. The reduced current demand means that current from the rectified mains terminal is again available to charge the supply capacitor. The Vcc voltage 202 across the supply capacitor therefore increases again until the start threshold $V_{start}$ is reached.

At a fourth time instant $t_4$ the switch toggling unit of the controller is again enabled as the Vcc voltage 202 across the supply capacitor again reaches the $V_{start}$ threshold. The period of time between the third time instant $t_3$ and the fourth time instant $t_4$ when the switch toggling unit is disabled may be referred to as a restart phase. A similar cycle takes place between the fourth time instant $t_4$ and the fifth time instant $t_5$ as was described with regard to the operating phase between the second time instant $t_2$ and the third time instant $t_3$. Unless the current available from rectified mains terminal increases, this cycle can repeat indefinitely. The consequence of the repeated enabling and disabling of the switch toggling unit is that the voltage at the output of the switched mode power supply 100 oscillates in an undesired manner. This oscillation can mean that the output of the SMPS 100 is unusable in a practical sense. Further, if the SMPS 100 is being used for a lighting application, then the oscillation of the output of the SMPS 100 can cause undesirable and potentially dangerous oscillations/flickering in the lighting output. Such oscillations can be a trigger for epileptic seizures in users and so are not acceptable in many applications. For applications in power supply units, such as cellular phone chargers, the on-off behaviour is unwanted because the charging electronics in the phone could get confused by the oscillating output.

Returning now to FIG. 1, in order to increase the current available to the Vcc terminal 120 of the controller 106, the resistance of the current limiting resistor 124 could be reduced. However, then the issue just shifts to a lower mains input voltage. That is, there may still be a mains current level that results in undesired oscillation of the output, as described above with reference to FIG. 2. That is, as the mains voltage is increased from zero, there will still be a certain voltage that is just enough to provide the current needed for start-up but not enough current to keep the converter operating.

In another example, the rectified mains voltage may be measured via an external resistive divider to a dedicated pin of the controller IC. This solution can however increase the number of external components and also may require an additional pin on the controller IC. For very low cost applications it may be important to maintain the IC pin count as low as possible. Low pin count packages are in general cheaper and also occupy less space on a printed circuit board.

A number of possible options for alleviating the problem of insufficient current available to the controller are discussed with reference to FIGS. 3 to 5.

One way to potentially improve the performance of the controller is to provide an additional current to charge the supply capacitor when the switch toggling unit is enabled.

Figure 3:
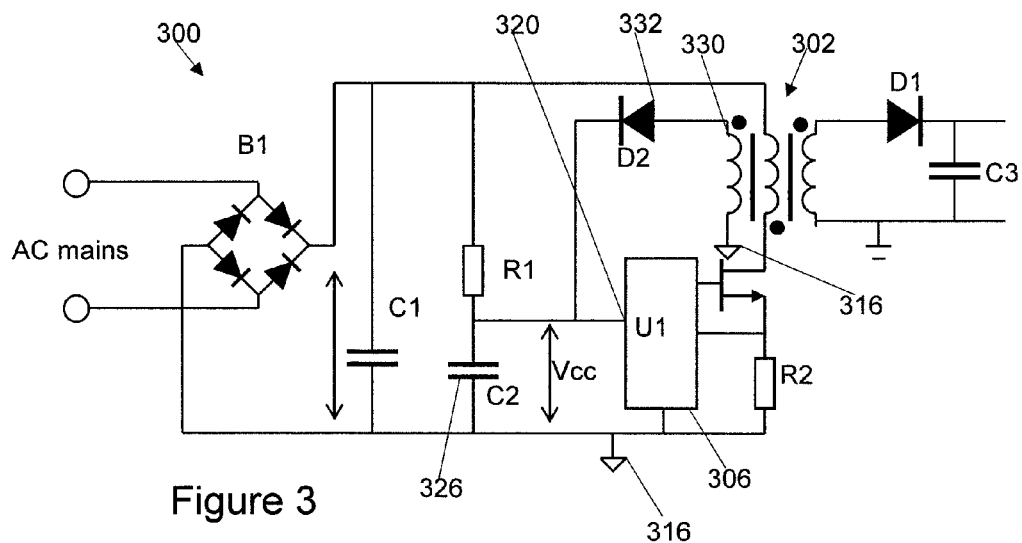
FIG. 3 illustrates a flyback converter similar to that of FIG. 1 in which a transformer of the converter has an additional auxiliary winding.

FIG. 3 illustrates a switched mode power supply (SMPS) 300 that is similar to that of FIG. 1. Components that have already been described with reference to FIG. 1 will not necessarily be described again here, and are given corresponding reference numbers in the 300 series. In FIG. 3, the transformer 302 has an additional auxiliary winding 330.

The additional auxiliary winding 330 provides an additional source of current to the controller 306 when the switch toggling unit is enabled.

A first terminal of the additional auxiliary winding 330 of the transformer 302 is connected to ground 316. A second terminal of the additional auxiliary winding 330 is connected to the Vcc terminal 320 of the controller 306 by a rectifying diode 332 such that when the switch toggling unit within the controller 306 is enabled, and a current is allowed to pass through the primary winding of the transformer 302, additional power is supplied to the Vcc terminal 320 of the controller 306 by the additional auxiliary winding 330. The supply capacitor 326 therefore receives an additional source of current during operation and so the potential across the supply capacitor 326 can be maintained at a sufficiently high enough level whilst the switch toggling unit is enabled, after start-up of the power supply.

A potential disadvantage of the solution drawn in FIG. 3 is that an additional winding and rectifier diode is needed, which increases the area of circuit board occupied by the circuit, as well as its cost.

Figure 4:
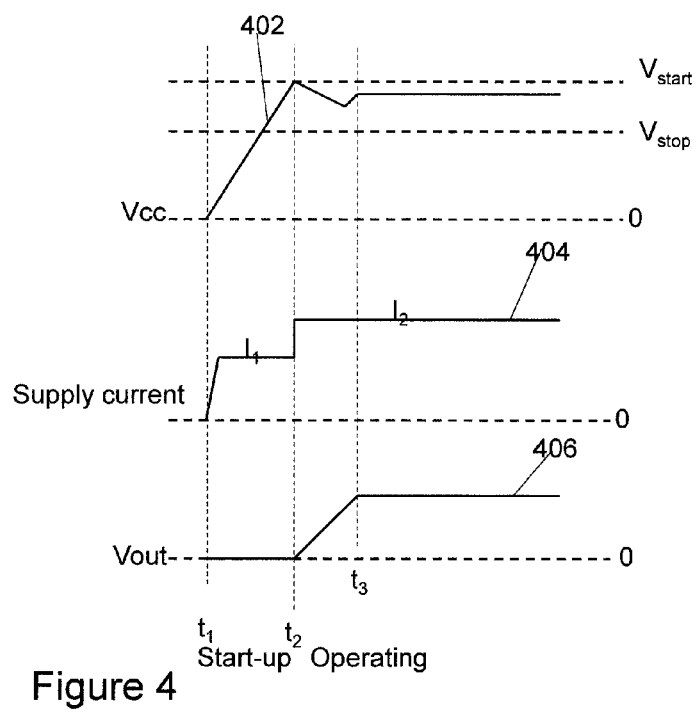
FIG. 4 illustrates the state of signals within the switched mode power supply of FIG. 3 during start-up and operation.

FIG. 4 illustrates the state of signals within the switched mode power supply of FIG. 3 during operation. A first curve in FIG. 4 relates to the voltage 402 at the Vcc terminal of the controller. A second curve relates to a current 404 drawn by the controller at the Vcc terminal. The first and second curves are of the same type as the signals illustrated in FIG. 2. In addition, FIG. 4 also illustrates a corresponding output voltage 406 of the switched mode power supply as a third curve.

At a first time instant $t_1$, the switched mode power supply is turned on and a start-up phase of the controller is initiated. At the beginning of the start-up phase, the current 402 drawn by the controller rises rapidly to a first current level $l_1$. The first current level $l_1$ relates to the current required by the controller whilst the switch toggling unit is disabled. During the start-up phase, the Vcc voltage 402 increases linearly as current from the mains supply is available to charge the supply capacitor.

At a second first time instant $t_2$ the Vcc voltage 402 has increased to the start threshold $V_{start}$. Once the Vcc voltage 402 has reached the start threshold $V_{start}$, the switch toggling unit of the controller is enabled. As discussed with regard to FIG. 2, when the switch toggling unit is enabled, the current drawn by the controller increases from the first current level $l_1$ to a second current level $l_2$. In this example the increased current drawn by the controller causes the Vcc voltage 402 to decrease. However, once the switch toggling unit is enabled, an additional source of current is available at the Vcc terminal of the controller from the additional auxiliary winding. This prevents the Vcc voltage 402 at the Vcc terminal of the controller from falling below the stop threshold $V_{stop}$. As such, the controller continues to operate the switch toggling unit in a steady state and the current 404 drawn by the controller can remain at the second current level $l_2$.

During the start-up phase, between the first and second time instants $t_1$, $t_2$, the output voltage 406 of the switched mode power supply is zero because the switch toggling unit is disabled and so no energy is transferred from the mains input terminals to the output of the SMPS. Once the switch toggling unit is enabled at the second time instant $t_2$, the output voltage 406 increases between the second time instant $t_2$ and a third time instant $t_3$. At the third time instant $t_3$, the desired operating output voltage of the SMPS has been reached. The SMPS maintains a constant output voltage after the third time instant $t_3$.

Figure 5:
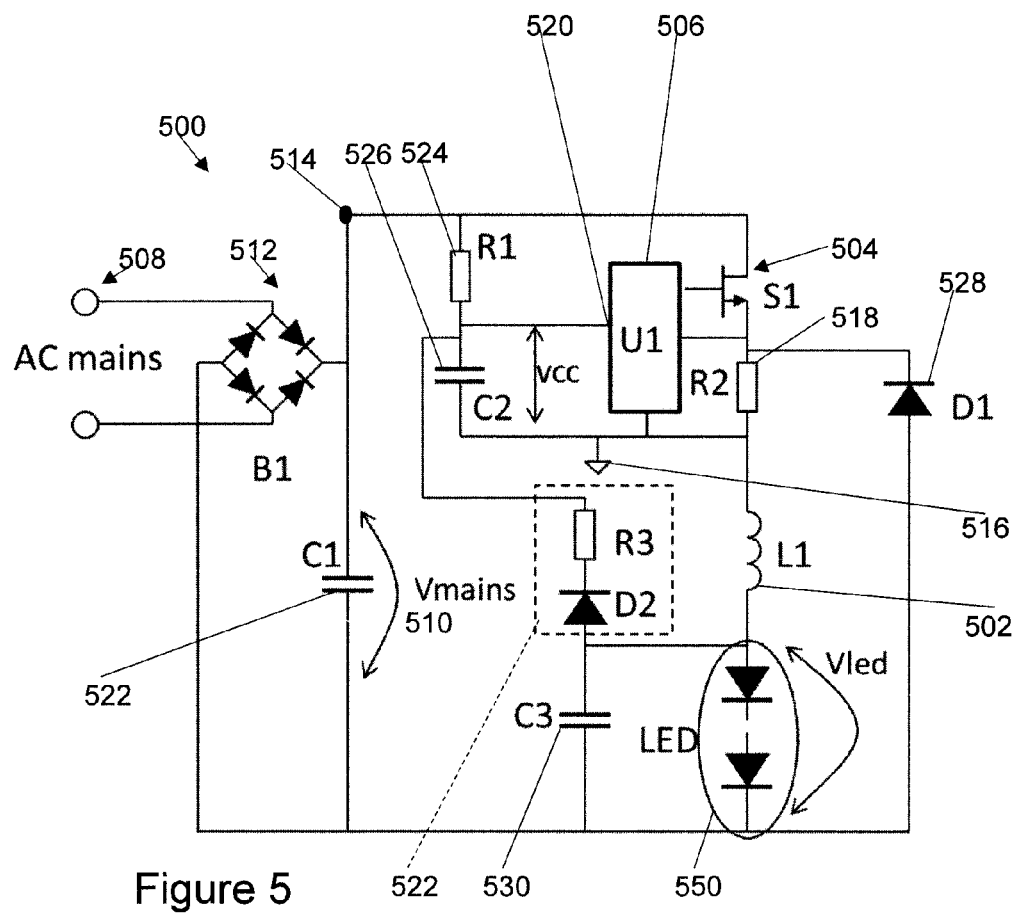
FIG. 5 illustrates a switched mode power supply for providing power for LED lighting using a buck mode configuration.

FIG. 5 illustrates a switched mode power supply (SMPS) 500 for providing LED lighting using a buck mode configuration. Components that have already been described with reference to FIG. 1 will not necessarily be described again here, and are given corresponding reference numbers in the 500 series.

The switched mode power supply (SMPS) 500 comprises an inductor 502, instead of a transformer as in a flyback converter. The power switch 504 is connected between the rectified mains terminal 514 and a buck loop. The buck loop comprises a buck loop resistor 518 with a first terminal and a second terminal. The first terminal of the buck loop resistor 518 is connected to the power switch 504. The second terminal of the buck loop resistor 518 is connected to the ground terminal 516. The inductor 502 is connected in series with a string of LEDs 550 and a buck diode 528 between the first and second terminals of the buck loop resistor 518.

The string of LEDs 550 is provided in parallel with an output smoothing capacitor 530 and represents a load of the SMPS 500. A first plate of the output smoothing capacitor 530 is coupled to an anode of the LEDs 550. A second plate of the output smoothing capacitor 530 is coupled to a cathode of the LEDs 550. An output voltage of the SMPS 500 is provided across the output smoothing capacitor 530.

A current feedback block 552 is also provided. The current feedback block 552 comprises a diode and a resistor in series. The current feedback block 552 connects the first plate of the output smoothing capacitor 530 to the first plate of the supply capacitor 526 (and hence the Vcc terminal 520 of the controller 506).

On start-up of the SMPS 500, the supply capacitor 526 is charged from the rectified mains voltage 510 via the current limiting resistor 524. The charge current $l(R1)$ through the current limiting resistor 524 during start-up is $l(R1)=(V_{mains}-Vcc-V_{led})/R1$, where $V_{mains}$ is the voltage across the input smoothing capacitor 522, Vcc is the controller input voltage (the voltage across the supply capacitor 526) and $V_{led}$ is the voltage across the string of LEDs 550.

If $V_{led}$ is initially zero during start-up, the charge current $l(R1)$ is larger than when the converter is operating and $V_{led}$ is larger than zero. Therefore, as soon as the LED voltage $V_{led}$ rises during operation (after start-up), the charge current $l(R1)$ through the current limiting resistor 524 drops. This drop in current causes the controller input voltage Vcc to drop after start-up if the current is not large enough to supply the controller 506, and again can result in undesired on-off operation.

The current feedback block 552 is provided to prevent this on-off operation. As soon as the LED voltage $V_{led}$ starts to rise, current is also supplied to the Vcc terminal 520 of the controller 506 via the current feedback block 552. Adding the current feedback block 552 increases the cost of the total application and also increases the circuit board area that is required for implementation of the SMPS 500. The area available for components can be very limited in some applications, such as in LED retrofit lamps.

In each of the preceding examples, if during start-up of the power supply the surplus current (current that is not drawn by the controller) available at the first plate of the supply capacitor from the supply resistor is smaller than the current demand of the controller during operation (when the switch toggling unit is enabled) then the SMPS will continue to operate in a steady state once the switch toggling unit is enabled. So, in general it may be desirable to test that the quantity $$(V\text{mains}-Vcc)/R1-l(U1_{start\text{-}up})$$

is smaller than $$(V\text{mains}-Vcc-V\text{led})/R1-l(U1_{operate}),$$

where $l_{start\text{-}up}$ is the current drawn by the controller during start-up and $l_{operate}$ is the current drawn by the controller during operation.

The controller described below with reference to FIGS. 6 to 11 addresses the problem of undesired output oscillation by advantageously only enabling a switch toggling unit when sufficient current is available from a rectified mains input to sustain operation of the SMPS during steady state operation. Such a controller may not require a significant number of additional components, nor may it require an additional pin/terminal on the controller integrated circuit, nor may it use power from the output of the SMPS.

Figure 6:
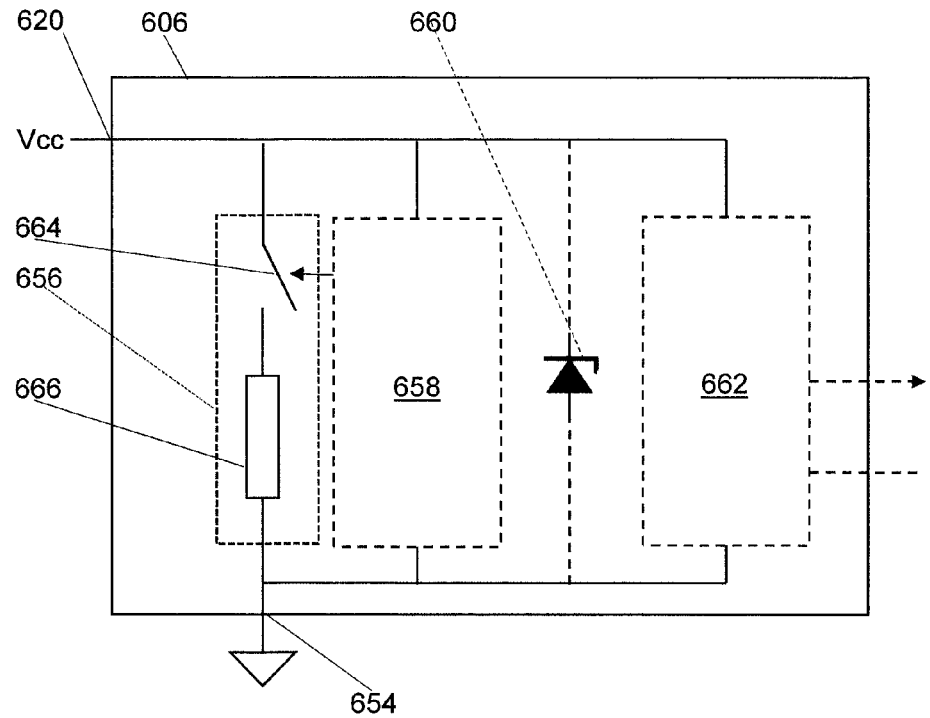
FIG. 6 illustrates a schematic representation of a controller that is configured to enable a switch toggling unit when sufficient current is available from the output of the power supply to sustain operation of the power supply in a steady state.

FIG. 6 illustrates a controller 606 for a switched mode power supply such as the switched mode power supplies described with reference to FIGS. 1, 3 and 5. The controller has a Vcc terminal and a ground terminal. The Vcc terminal of the controller 606 is an example of a first terminal 620 for receiving a controller input voltage Vcc that is derived from a rectified mains. The ground terminal is an example of a second terminal 654 for connecting the switched mode power supply to ground.

A selectably engagable load 656 is connected between the first terminal 620 and the second terminal 654. In this example the selectably engagable load 656 comprises a switch 664, such as a transistor switch, and a resistor 666 connected in series. Alternatively, the selectably engagable load 656 could be implemented as a controllable current source or any other component that can be controlled so as to selectably draw a current from the first terminal 620. A controllable current source can be easily implemented in an integrated circuit, and in some examples may already be available and therefore not require any additional components.

A load selector 658 is also connected to the first terminal 620 and the second terminal 654. The load selector 658 is configured to engage the selectably engagable load 656 between the first and second terminals 620, 654 in order to draw a selectably engagable load current, or additional current drain $l_{extra}$. In one example, the load selector 658 may engage the selectably engagable load 656 in response to the connection of a Vcc voltage across the first and second terminals 620, 654. The engagement may be triggered by a comparison between the level of the Vcc voltage received at the first terminal 620 and an engagement threshold. Alternatively, engagement may be made on activation of the controller 606. The controller 606 can be considered to be activated when a voltage level sufficient to operate the load selector 658 is provided to the first terminal 620.

Subsequently, the load selector 658 is configured to disengage the selectably engagable load 656 from the first and second terminals 620, 654 in accordance with a comparison between the level of the Vcc voltage received at the first terminal 620 and a disengagement threshold.

A switch toggling unit 662, such as that described with reference to FIG. 1, is optionally provided within the controller 606. In other examples, the switch toggling unit 662 can be external to the controller 606. The switch toggling unit 662 is enabled when a controller input voltage Vcc at the first terminal 620 reaches a start threshold $V_{start}$ (with reference to the second terminal 654). Once the switch toggling unit 662 is enabled it provides a switch control signal that toggles a power switch of the SMPS between an open state and a closed state in order to transfer energy from the mains input terminals to the output of the switched mode power supply. The switch toggling unit 662 draws a parasitic operating current from the first terminal 620 when it is enabled.

By engaging the selectably engagable load 656, the controller 606 can increase the current drawn by the first terminal 620 of the controller 606 and so reduce the amount of current that is available for charging a supply capacitor that is also connected to the first terminal 620 of the controller 606, thereby slowing down the charging-up of the supply capacitor. While the selectably engagable load 656 is engaged, and once the level of the voltage received at the first terminal 620 has increased to the disengagement threshold, then the level of the voltage received at the first terminal 620 may be considered sufficient to operate the switched mode power supply without causing oscillation at the output of the SMPS. The selectably engagable load 656 may then be disengaged at the disengagement threshold $V_{disengage}$. The additional current drain $l_{extra}$ may be removed when the voltage at, or available current to, the first terminal 620 meets the start threshold $V_{start}$ which enables the switch toggling unit 662. That is, the start threshold $V_{start}$ may be the same as the disengagement threshold $V_{disengage}$. The operation of the switch mode power supply (or the switch toggling unit) after the switch toggling unit is enabled may be similar to that of power supplies known in the art.

The engagement and subsequent disengagement of the selectably engagable load 656 can prevent the switch toggling unit from being enabled at suboptimal supply currents or voltages that could cause oscillation of the output of the power supply if the switch toggling unit 662 were enabled.

A Zener diode 660 is optionally provided in a reverse biased configuration between the first and second terminals 620, 654 in order to ensure that a maximum voltage between the first and second terminals 620, 654 is not exceeded.

The load selector 658 and the switch toggling unit 662 are provided in a unitary housing of the controller 606 in this example. Providing the load selector 658 and the switch toggling unit 662 in the same housing allows the number of discrete component connections within a SMPS employing the controller 606 to be reduced. The amount of circuit board area occupied may also be reduced. Alternatively, the load selector 658 and the switch toggling unit 662 may be provided separately.

Figure 7:
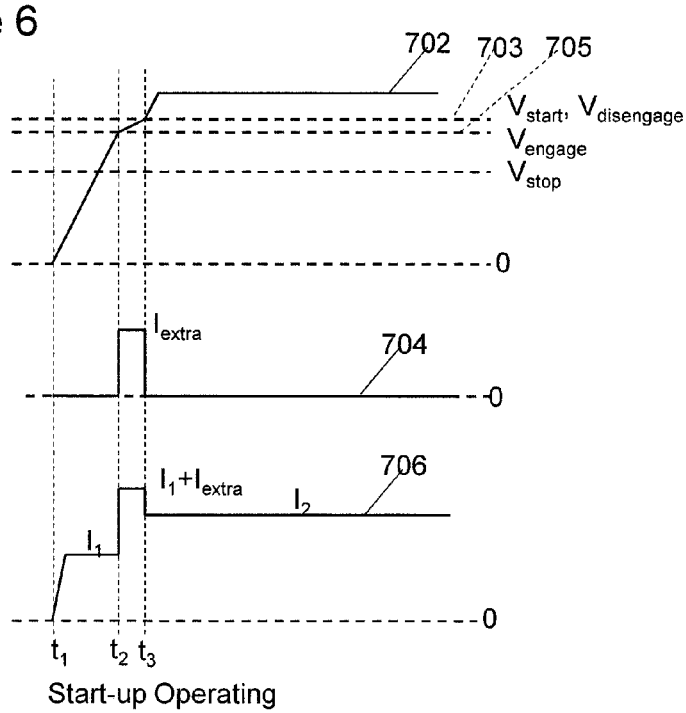
FIG. 7 illustrates signals associated with use of the controller of FIG. 6.

FIG. 7 illustrates the behaviour of the controller 606 of FIG. 6 that shows how an input current can be made adequate for supporting steady state operation of the switch toggling unit. A first curve shows a controller input voltage 702 at the Vcc terminal of the controller against time. A second curve shows, against time, a current 704 drawn by the selectably engagable load. A third curve shows the current 706 drawn by the controller against time.

The SMPS is turned on at a first time instant $t_1$ and a start-up phase commences. At the beginning of the start-up phase the current 706 drawn by the controller increases rapidly. The current 704 drawn by the controller rises rapidly when the controller is switched on until a first current level $l_1$ is reached. The current 704 drawn by the controller then becomes constant at the first current level $l_1$. During this period, the voltage 702 at the Vcc terminal of the controller increases linearly as the supply capacitor of the switched mode power supply receives current from the power supply and builds up charge across its plates.

Once the voltage 702 at the Vcc terminal of the controller reaches the engagement threshold $V_{engage}$ 705, the selectably engagable load is engaged at a second time instant $t_2$.

A selectably engagable load current, or additional current drain $l_{extra}$ is provided between the first and second terminals of the controller when the selectably engagable load is engaged. The additional current drain $l_{extra}$ is shown in the current 704 through the engagable load device and results in the controller drawing an increased current $l_1+l_{extra}$ from the first terminal. That is, the supply current 706 drawn by the controller during start-up is increased.

The selectably engagable load current can be set in accordance with a difference between the start-up current ($l_1$) and the operating current ($l_2$). The selectably engagable load current can be set to be greater than or equal to the operating current drawn by the controller (or switched mode power supply as a whole) during operation ($l_2$) minus the drawn start-up current ($l_1$).

The increase in the current 706 drawn by the controller means that less current is available from the rectified mains input to charge the supply capacitor, so the voltage 702 at the Vcc terminal of the controller increases more slowly when the selectably engagable load is engaged.

In some examples, engagement of the selectably engagable load could be made immediately when the voltage 702 at the Vcc terminal starts rising. For example, the engagement threshold $V_{engage}$ could be 0 V. However, selecting this option for the engagement threshold $V_{engage}$ will extend the start-up time because less current is available to charge the supply capacitor for a longer period of the start-up. Therefore, engaging the selectably engagable load just before the voltage 702 reaches the start threshold $V_{start}$ can reduce the period in which the voltage 702 at the Vcc terminal of the controller increases slowly. In other words, having a non-zero engagement threshold $V_{engage}$ can be advantageous.

Once the voltage 702 at the Vcc terminal of the controller reaches a start threshold $V_{start}$, the switch toggling unit within the controller is enabled in the same way as described above. The enabling of the switch toggling unit occurs at a third time instant $t_3$.

Once the voltage 702 at the Vcc terminal of the controller reaches a disengagement threshold $V_{disengage}$, the selectably engagable load is disengaged. In this example, the disengagement threshold $V_{disengage}$ is the same as the start threshold $V_{start}$ of the switch toggling unit and so the disengagement occurs at the third time instant $t_3$.

In general, the disengagement threshold is set in accordance with the operating current. For example, the disengagement threshold may correspond to the provision of a current that is greater than or equal to the operating current demand of (required by) the controller.

After disengagement, the current 706 drawn by the controller falls to an operating current level, or second current level $I_2$. The current demand falls because the current required during start-up (with the selectably engagable load engaged) is higher than the current required by the controller during operation of the switch toggling unit.

Figure 8:
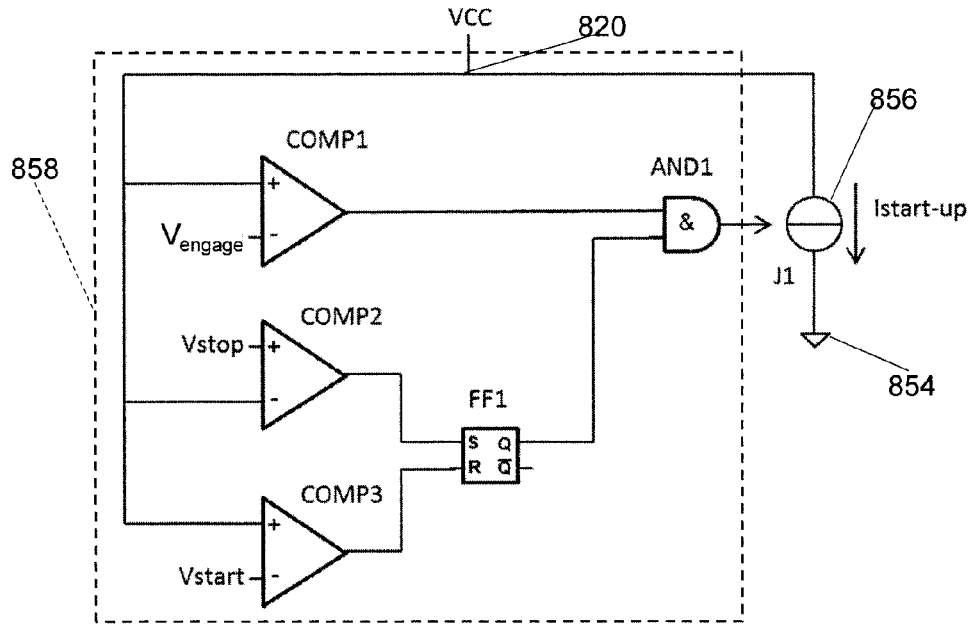
FIG. 8 illustrates an implementation of a controller that can provide the functionality of the controller discussed in relation to FIGS. 6 and 7.

FIG. 8 illustrates an implementation of a controller 806 that can provide the functionality of the controller discussed in relation to FIGS. 6 and 7.

The controller comprises a first terminal 820 and a second terminal 854 with a load selector 858 and a selectably engagable load 856 connected in parallel between the first and second terminals 820, 854. The selectably engagable load 856 is implemented as a current source.

The load selector 858 comprises a first comparator COMP1, a second comparator COMP2, a third comparator COMP3, an AND logic gate AND1, and a SR-type flip-flop FF1. The first comparator COMP1 has a non-inverting input connected to the first terminal 820 and an inverting input configured to receive the engagement threshold $V_{engage}$. The second comparator COMP2 has an inverting input connected to the first terminal 820 and a non-inverting input configured to receive the stop threshold $V_{stop}$. The third comparator COMP3 has a non-inverting input connected to the first terminal 820 and an inverting input configured to receive the start threshold $V_{start}$, which is the same as the disengagement threshold $V_{disengage}$ in this example. The SR-type flip-flop FF1 has a set input S connected to an output of the second comparator COMP2 and a reset input R connected to an output of the third comparator COMP3. An output Q of the SR-type flip-flop FF1 is provided to a first input of the AND logic gate AND1. An output of the first comparator COMP1 is provided to a second input of the AND logic gate AND1. The output of the AND logic gate AND1 is configured to provide a control signal for the selectably engagable load 856.

Figure 9:
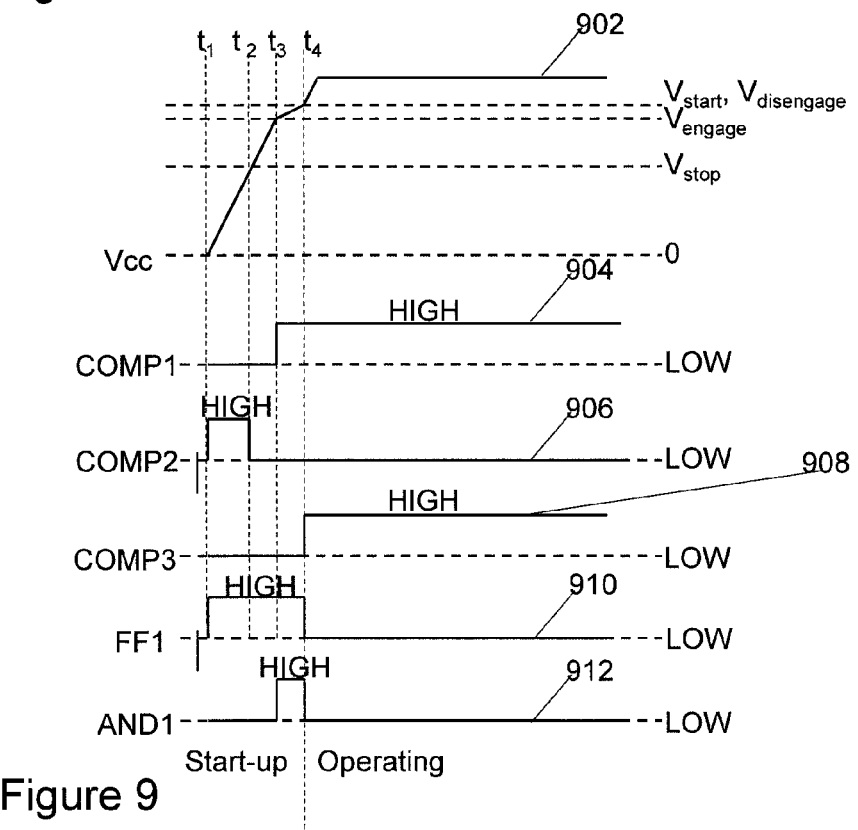
FIG. 9 illustrates signals associated with use of the controller of FIG. 8.

FIG. 9 illustrates the behaviour of the controller of FIG. 8 that shows how an input current can be controlled such that it is adequate for supporting steady state operation of a switched mode power supply. A first curve shows a controller input voltage 902 at the Vcc terminal of the controller against time and is the same as the curve described with reference to FIG. 7. Additional curves are provided that illustrate the logic state of signals at the output of the first comparator (COMP1) 904, second comparator (COMP2) 906, third comparator (COMP3) 908, SR-type flip-flop (FF1) 910 and AND logic gate (AND1) 912.

The switched mode power supply is turned on at a first time instant $t_1$ and a start-up phase commences. On start-up, the controller input voltage 902 is 0 V and so the output of the first comparator (COMP1) 904 and third comparator (COMP3) 908 are at the LOW logic level and the output of the second comparator (COMP2) 906 is at the HIGH logic level. The output Q of the SR-type flip-flop FF1 is therefore set HIGH by the second comparator (COMP2) 906 and the output of the AND logic gate (AND1) 912 is LOW.

At a second time instant $t_2$ the controller input voltage 902 has increased to the stop threshold $V_{stop}$ and so the second comparator (COMP2) 906 transitions to the LOW logic level. The output of the first comparator (COMP1) 904 and third comparator (COMP3) 908 remain LOW. The output Q of the SR-type flip-flop FF1 and the output of the AND logic gate (AND1) 912 are unaffected.

At a third time instant $t_3$ the controller input voltage 902 has increased to the engagement threshold $V_{engage}$ the first comparator (COMP1) 904 transitions to the HIGH logic level. The output of the AND logic gate (AND1) 912 is therefore HIGH because both its first and second inputs are HIGH. The selectably engagable load is therefore engaged.

At a fourth time instant $t_4$ the controller input voltage 902 has increased to the disengagement threshold $V_{disengage}$ (which is the same as the start threshold $V_{start}$ in this example). The third comparator (COMP3) 908 transitions to the HIGH logic level and so the SR-type flip-flop FF1 is reset. The output (Q) 912 of the SR-type flip-flop FF1 transitions to the LOW logic level and so the output 912 of the AND logic gate (AND1) is also therefore brought low. The selectably engagable load is therefore disengaged. The selectably engagable load can only be engaged again after the SR-type flip-flop FF1 is set again; after the controller input voltage 902 has fallen below the stop threshold $V_{stop}$.

Figure 10:
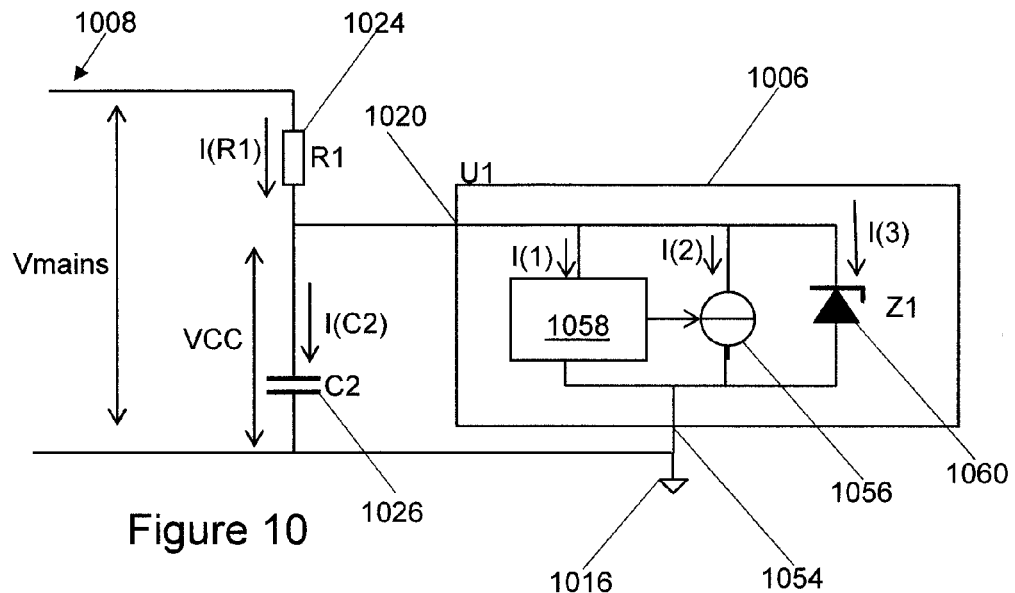
FIG. 10 illustrates a schematic representation of a controller similar to that of FIG. 6, and associated circuitry.

FIG. 10 illustrates a schematic representation of a controller 1006 similar to that of FIG. 6 and associated circuitry.

Within the controller 1006, a selectably engagable load 1056, load selector 1058 and reversed biased Zener diode 1060 are connected in parallel between a Vcc terminal 1020 of the controller and a ground terminal 1054 of the controller 1006. In this example, a switch toggling unit is provided together with the load selector 1058. The operation of these components is as discussed with regard to FIG. 6. In this example, the selectably engagable load 1056 is a current source.

A current limiting resistor 1024 and a supply capacitor 1026 are provided between a rectified mains terminal 1014 and a ground terminal 1016 of the SMPS. The supply capacitor 1026 has a first plate and a second plate. The second plate is connected to the ground terminal 1016 of the SMPS. The current limiting resistor 1024 is connected between the rectified mains terminal 1014 of the SMPS and the first plate of the supply capacitor 1026. The first plate of the supply capacitor 1026 is connected to the Vcc terminal 1020 of the controller 1006.

Various currents and voltages are associated with the components in FIG. 10. These currents and voltages are listed below and discussed with reference to the signals in FIG. 11.
I(1)—current through the combined switch toggling unit and load selector 1058;
I(2)—current through the selectably engagable load 1056;
I(3)—current through the reversed biased Zener diode 1060;
I(R1)—current through the current limiting resistor 1024;
I(C1) current drawn by the supply capacitor 1026;
Vcc—controller input voltage (voltage across the supply capacitor 1026; voltage at the Vcc terminal 1020 of the controller with respect to the ground terminal of the controller); and
$V_{mains}$—rectified mains voltage between the rectified mains terminal 1014 and a ground terminal 1016 of the SMPS.

Figure 11:
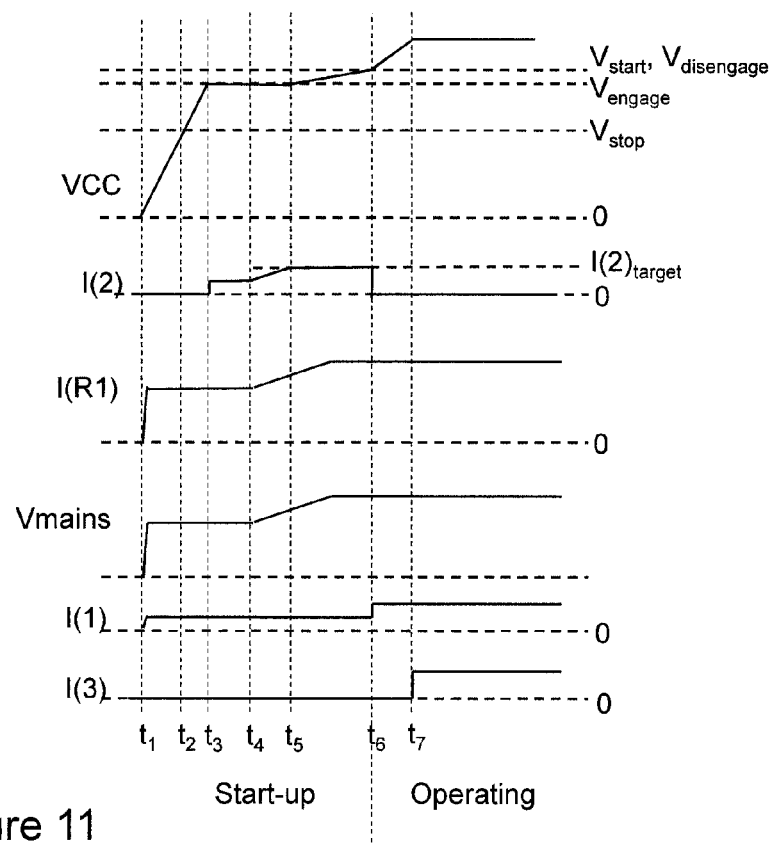
FIG. 11 illustrates signals associated with the controller of FIG. 10.

FIG. 11 illustrates signals associated with the controller of FIG. 10 that controls the input current such that is adequate for supporting steady state operation of a switch toggling unit within the controller is provided. The signals illustrated in FIG. 11 include the Vcc, l(2), l(R1), $V_{mains}$, l(1) and (3). The state of the signals is discussed below at a number of important instants in time during the start-up and operation of the controller 1006.

Due to current conservation, it is always the case in the circuit shown in FIG. 11 that l(R1)=l(C2)+l(1)+l(2)+l(3).

At a first time instant $t_1$, on start-up of the controller input voltage Vcc=0 V.

l(1)>0 because current is drawn by the combined switch toggling unit and load selector during start up.

l(2)=0 l(3)=0 l(R1)=l(C2)+l(1)

So l(C2)=l(R1)−l(1)

If l(R1)>l(1) then C2 is charges and the controller input voltage Vcc increases linearly as seen in FIG. 11.

At a second time instant $t_2$, the controller input voltage Vcc meets the stop threshold $V_{stop}$ of the controller (which at this stage has no effect on operation of the controller because it has not yet started).

It will be appreciated that the selectably engagable load current l(2) drawn by the selectably engagable load has a maximum or target value $l(2)_{target}$ which is also referred to as the selectable load current $l_{extra}$. If the rectified mains terminal cannot deliver the target current $l(2)_{target}$ (because not enough current is available) then the actual current drawn by the selectably engagable load will be lower than target current $l(2)_{target}$.

At a third time instant $t_3$, the controller input voltage Vcc meets the engagement threshold $V_{engage}$ of the controller.

l(3)=0 l(R1)=l(C2)+l(1)+l(2)

So l(C2)=l(R1)−l(1)−l(2)

If l(R1)<l(1)+l(2)$_{target}$ then there is no surplus current to provide to the supply capacitor and so it does not charge. l(2) is lower than the target value. The controller does not start up the switch toggling unit because the rectified mains voltage $V_{mains}$ is too low.

Between the third time instant $t_3$ and a fourth time instant $t_4$ the current l(R1) is insufficient to provide the target value $l(2)_{target}$ of the selectably engagable load current l(2).

At the fourth time instant $t_4$, the mains supply rectified mains voltage $V_{mains}$ increases.

At a fifth time instant $t_5$, the mains supply rectified mains voltage $V_{mains}$ is now high enough for l(R1) to supply l(1) and $l(2)_{target}$. The targeted value of the selectably engagable load current $l(2)_{target}$ is therefore drawn by the selectably engagable load.

After the fifth time instant $t_5$, l(R1) is now above l(1) and $l(2)_{target}$ and so a surplus current l(C2) is provided to charge the supply capacitor. The rectified mains voltage $V_{mains}$ continues to increase. As the charge on the supply capacitor increases due to the supply of the surplus current l(C2), the controller input voltage Vcc also increases.

At a sixth time instant $t_6$, the controller input voltage Vcc reaches the disengagement threshold $V_{disengage}$ and the start threshold $V_{start}$. The switch toggling controller is enabled because the start threshold $V_{start}$ has been met and so the current consumption l(1) of the controller increases. The selectably engagable load current l(2) is disengaged because the disengagement threshold $V_{disengage}$ has been met. The supply capacitor can charge further because the selectably engagable load current l(2) has been switched off, and so the controller input voltage Vcc continues to increase. At a sixth time instant $t_6$, l(C2)=l(R1)−l(1).

At a seventh time instant $t_7$, the controller input voltage Vcc reaches a clamp voltage of the Zener diode and so l(3) increases. The Zener diode 1060 is provided to limit the Vcc voltage for safety reasons.

The SMPS is now operating in a steady state and output power will be provided by the SMPS until the rectified mains voltage $V_{mains}$ falls before the stop threshold $V_{stop}$.

It will be appreciated that any components that are described herein as being coupled or connected could be directly or indirectly coupled or connected. That is, one or more components could be located between two components that are said to be coupled or connected whilst still enabling the required functionality to be achieved.

The invention claimed is:

1. A controller for a switched mode power supply, SMPS, comprising:
   a first terminal for receiving a controller input voltage;
   a second terminal for coupling to ground;
   a selectably engagable load;
   a load selector configured to:
      engage the selectably engagable load between the first and second terminals in order to draw a selectably engagable load current, and
      disengage the selectably engagable load from the first and second terminals in accordance with a comparison between a disengagement threshold and the controller input voltage or a controller input current at the first terminal.

2. The controller of claim 1, wherein the load selector is configured to engage the selectably engagable load in accordance with a comparison between an engagement threshold and the controller input voltage or the input current at the first terminal.

3. The controller of claim 1, wherein the load selector is configured to engage the selectably engagable load on activation of the controller.

4. The controller of claim 1, wherein the load selector comprises a computer program.

5. A switched mode power supply, SMPS, comprising the controller of claim 1.

6. An LED lighting system comprising the controller of any of claims 1 or the switched mode power supply of claim 5.

7. The controller of claim 1, wherein the switched mode power supply comprises a switch arranged between an input and an output of the SMPS and operable between an open state and a closed state, and the switched mode power supply or the controller comprises a switch toggling unit configured, when the switch toggling unit is enabled by the controller input voltage or input current at the first terminal reaching a start threshold, to toggle the switch between the open state and the closed state in order to transfer energy from the input to the output of the SMPS.

8. The controller of claim 7, wherein the start threshold is equal to the disengagement threshold.

9. The controller of claim 7, wherein the switched mode power supply comprises:
   a supply capacitor with a first plate and a second plate, the first plate connected to the first terminal of the controller and the second plate connected to the second terminal of the controller; and a current limiting resistor coupled between the first terminal of the controller and the input of the SMPS.

10. The controller of claim 7, wherein the switched mode power supply is configured to draw an operating current from the input of the SMPS when the switch toggling unit is enabled, wherein the switched mode power supply is configured to draw a start-up current from the input of the SMPS when the switch toggling unit is disabled, and wherein the selectably engagable load current is set in accordance with a difference between the start-up current and the operating current.

11. The controller of claim 10, wherein the disengagement threshold is set in accordance with the operating current.

12. The controller of claim 7, wherein the controller comprises the switch toggling unit.

13. The controller of claim 12, wherein the controller is provided in a unitary housing.

14. The controller of claim 12, wherein the switch toggling unit is configured, when enabled, to provide a control signal for setting the state of the switch, the controller further comprising a switch control terminal for providing the control signal to the switch of the switched mode power supply.

15. The controller of claim 12, comprising a comparator unit configured to enable the switch toggling unit when the controller input voltage or input current at the first terminal meets the start threshold.

* * * * *